(12) United States Patent
Howard et al.

(10) Patent No.: US 7,706,742 B2
(45) Date of Patent: Apr. 27, 2010

(54) COMMUNICATIONS MODULE FOR WIRELESS COMMUNICATIONS WITH AN ELECTRONIC DEVICE TO ENABLE REMOTE ACCESS

(75) Inventors: Michael L. Howard, Sandy, UT (US); William R. Harper, Jr., Salt Lake City, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 953 days.

(21) Appl. No.: 09/922,813

(22) Filed: Aug. 6, 2001

(65) Prior Publication Data

US 2003/0027593 A1 Feb. 6, 2003

(51) Int. Cl.
*H04B 3/36* (2006.01)
(52) U.S. Cl. .................. 455/7; 370/315; 702/188
(58) Field of Classification Search ............. 455/557, 455/418, 419, 420, 7–10, 14–25; 340/539.1, 340/539.14, 539.17; 370/315; 702/188
See application file for complete search history.

(56) References Cited

U.S. PATENT DOCUMENTS

| | | | |
|---|---|---|---|
| 5,544,036 A | 8/1996 | Brown, Jr. et al. | 364/145 |
| 5,608,655 A | 3/1997 | Moughanni et al. | 364/514 R |
| 5,640,153 A | 6/1997 | Hildebrand et al. | 340/825.06 |
| 6,021,492 A * | 2/2000 | May | 726/1 |
| 6,147,601 A | 11/2000 | Sandelman et al. | 340/506 |
| 6,160,477 A * | 12/2000 | Sandelman et al. | 340/506 |
| 6,211,782 B1 | 4/2001 | Sandelman et al. | 340/506 |
| 6,229,846 B1 * | 5/2001 | Lassig et al. | 375/222 |
| 6,236,332 B1 * | 5/2001 | Conkright et al. | 340/3.1 |
| 6,477,206 B1 * | 11/2002 | Chatani | 375/260 |
| 6,891,838 B1 * | 5/2005 | Petite et al. | 370/401 |
| 2002/0016639 A1 * | 2/2002 | Smith et al. | 700/9 |
| 2002/0019712 A1 * | 2/2002 | Petite et al. | 702/61 |
| 2002/0019831 A1 * | 2/2002 | Wade | 707/500 |
| 2002/0198978 A1 * | 12/2002 | Watkins | 709/223 |
| 2003/0083078 A1 * | 5/2003 | Allison et al. | 455/466 |

OTHER PUBLICATIONS

Austin Energy Web page, "Become a Power Partner with Austin Energy", pp. 1-2, printed Jun. 6, 2001.
Austin Energy Web page, "Honeywell Superstat", pp. 1-2, printed Jun. 6, 2001.
Honeywell Web page, "Energy Management", p. 1, printed Jun. 6, 2001.
Honeywell Web page, "Remote Control for Your Home's Heating/Cooling System", pp. 1-2, printed Jun. 6, 2001.
Honeywell Web page, "Honeywell Home Controller Gateway", pp. 1-2, printed Jun. 6, 2001.
Honeywell Web page, Your Home: Performance and Monitoring, pp. 1-3, printed Jun. 6, 2001.
Honeywell Web page, "Home Controller User Guide", Product Release Version 1.0.x, pp. 1-39, Copyright 2000, Honeywell, Inc.

* cited by examiner

*Primary Examiner*—Raymond S Dean
(74) *Attorney, Agent, or Firm*—Austin Rapp & Hardman

(57) ABSTRACT

A communications module is disclosed for facilitating wireless electronic communications with an electronic device. The communications module includes a processor and a wireless module in electronic communication with the processor for wireless communications with the electronic device. A paging module is also included that is in electronic communication with the processor for communicating with a computer through a paging network. The communications module also includes a modem in electronic communication with the processor for communicating with the computer through a communications network. Further, memory is in electronic communication with the processor for storing data.

49 Claims, 6 Drawing Sheets

COMMUNICATIONS MODULE FOR WIRELESS COMMUNICATIONS WITH AN ELECTRONIC DEVICE TO ENABLE REMOTE ACCESS

TECHNICAL FIELD

This invention relates generally to electronic devices, and is more particularly directed toward a communications module to enable electronic communications with an electronic device.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Computers typically have one or more processors. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

Embedded systems may be used to control and/or monitor appliances, machines, tools, sensors, the use of certain resources such as power or water, etc. Some embedded systems cannot be easily accessed and/or cannot easily be given inputs. Users of these embedded systems may be able to have more control over the operation of appliances, machines, tools, sensors and many other devices if the embedded system were more accessible to enter inputs and/or to communicate with. In addition, more information may be available to users if embedded systems were better adapted for communications with other embedded systems or computers. For example, if users were able to communicate with an embedded system controlling a thermostat, they may access the temperature from a remote location, or they may turn down the settings from a remote location. If users could more readily communicate with an embedded system in a vending machine, as a further example, vendors of products could remotely determine when certain items must be refilled or when there was a problem with the vending machine. Thus, benefits may be realized if communications with embedded systems were enabled and/or enhanced.

SUMMARY OF THE INVENTION

A communications module is disclosed for facilitating wireless electronic communications with an electronic device. The communications module includes a processor and a wireless module in electronic communication with the processor for wireless communications with the electronic device. A paging module is also included in electronic communication with the processor for communicating with a computer through a paging network. The communications module also includes a modem in electronic communication with the processor for communicating with the computer through a communications network. Further, memory is in electronic communication with the processor for storing data.

The communications module may also be programmed with instructions to cause the processor to communicate with the electronic device using the wireless module. There may also be instructions to cause the processor to communicate with the computer using the paging module. An embodiment of a communications module may also include memory programmed with instructions to cause the processor to communicate with the computer through the communications network using the modem.

The communications module may be programmed to periodically contact the computer. In addition, the communications module may be programmed to periodically contact the computer using the modem.

An outbound message queue may be maintained for outbound messages being sent from the electronic device to the computer. The outbound messages may be stored in the outbound message queue. The outbound messages may be sent to the computer when the computer is periodically contacted.

The communications module may be programmed to be periodically contacted by the electronic device. Moreover, the communications module may be programmed to be periodically contacted by the electronic device through the wireless module.

An inbound message queue may be maintained for inbound messages being sent to the electronic device from the computer. The inbound messages may be stored in the inbound message queue. Each inbound message may include a device ID. Inbound messages may be received from the computer when the computer is periodically contacted. The communications module may be programmed to send the inbound messages to the electronic device when the electronic device periodically contacts the communications module.

The communications module may further be programmed to identify the electronic device when the electronic device periodically contacts the communications module. In addition, the communication module may be programmed to search the inbound message queue for appropriate inbound messages for the electronic device and to transmit the appropriate inbound messages to the electronic device.

The communications module may be programmed to contact the computer using the modem in response to a request communication from the computer received through the paging module. The paging module may be a one-way paging module.

As stated, the communications module may be used to facilitate electronic communications between a computer and an electronic device. The communications module may also be used to facilitate electronic communications between a computer and a plurality of remote electronic devices.

A method is also disclosed for facilitating electronic communications between a computer and a remote electronic device. The method may be used in combination with the communications module. The method includes sending an inbound message, by the computer, to the communications module, storing the inbound message in an inbound message queue, sending the inbound message to the electronic device, receiving an outbound message from the electronic device, storing the outbound message in an outbound message queue, and sending the outbound message to the computer from the communications module.

The method may also include the step of communicating with the electronic device when the electronic device periodically contacts the communications module. Sending the inbound message to the electronic device may be accomplished through use of the wireless module. In addition, the modem may be used to accomplish sending the outbound message to the computer from the communications module.

The method may also include searching the inbound message queue for appropriate inbound messages for the electronic device and transmitting the appropriate inbound messages to the electronic device.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the embodiments of the invention.

Figure 1:
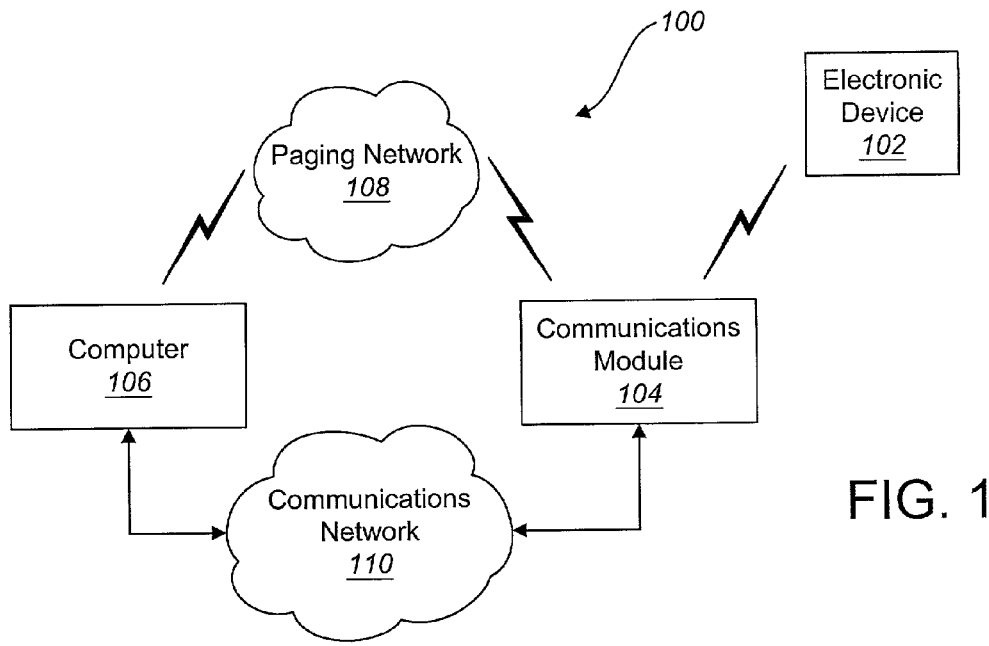
FIG. 1 is a network block diagram of an embodiment of a system for communicating with an electronic device.

FIG. 1 is a network block diagram of an embodiment of a system 100 for communicating with an electronic device 102. A communications module 104 facilitates electronic communications with the electronic device 102. As shown, the electronic device 102 may use wireless communications to communicate with the communications module 104. A computer 106 communicates with the electronic device 102 through the communications module 104. The computer 106 may communicate with the communications module 104 through a paging network 108, through a communications network 110, and/or through other communication means.

Paging networks 108 are known to those skilled in the art and are readily available for use. For example, one possible paging network 108 that may be used is the paging network provided by SkyTel Communications, Inc.

The communications network 110 is any communications network capable of facilitating communications between the communications module 104 and the computer 106. For example, the communications network 110 may be a pager network, a cellular network, a global communications network, the Internet, a computer network, a telephone network, etc. Those skilled in the art will appreciate the many different communications networks 110 that may be utilized with embodiments herein.

Generally, the communications module 104 facilitates communications between the electronic device 102 and the computer 106. The communications module 104 accomplishes this by forwarding messages to the computer 106 from the electronic device 102 and/or by forwarding messages to the electronic device 102 from the computer 106. Of course, it will be appreciated by those skilled in the art that other processing may take place on the communications module 104. Further details of the communications module 104 are set forth below.

The computer 106 is typically performing monitoring and/or controlling of the electronic device 102. The particular functions being performed by the computer 106 and the electronic device 102 depend on what the electronic device 102 is and how it is being used. Embodiments herein may be used with many different kinds of electronic devices 102 and computers 106 to facilitate communications. Generally, the electronic device 102 is any device, appliance, machine, tool, or the like that is capable of receiving and/or sending electronic signals or messages. Some examples of devices 102 are a vending machine, a telephone, a door lock, a temperature sensor, a motor, a switch, a light, a printer, a fax machine, a refrigerator, a health monitor, an elevator/escalator, a copier, a scanner, manufacturing equipment, industrial equipment, computer equipment and peripherals, security systems, monitoring equipment, a thermostat, and the like. The computer 106 is used to monitor, control and/or otherwise communicate with the electronic device 102.

Figure 2:
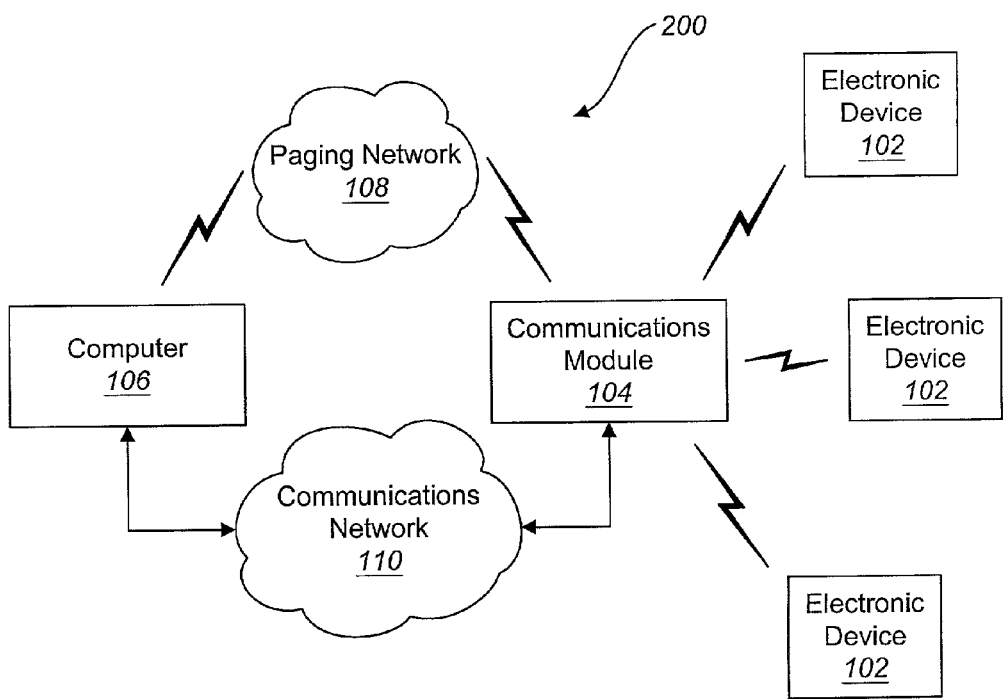
FIG. 2 is a network block diagram of an embodiment of a system for communicating with more than one electronic device.

FIG. 2 illustrates another embodiment of a system 200 for communications with more than one electronic device 102. The communications module 104 may communicate with one or more electronic devices 102. Although only three electronic devices 102 are shown, it will be appreciated by those skilled in the art that many electronic devices 102 may be accessed through the communications module 104. The number of electronic devices 102 that may be accessed through the communications module 104 may be static or dynamic.

Figure 3:
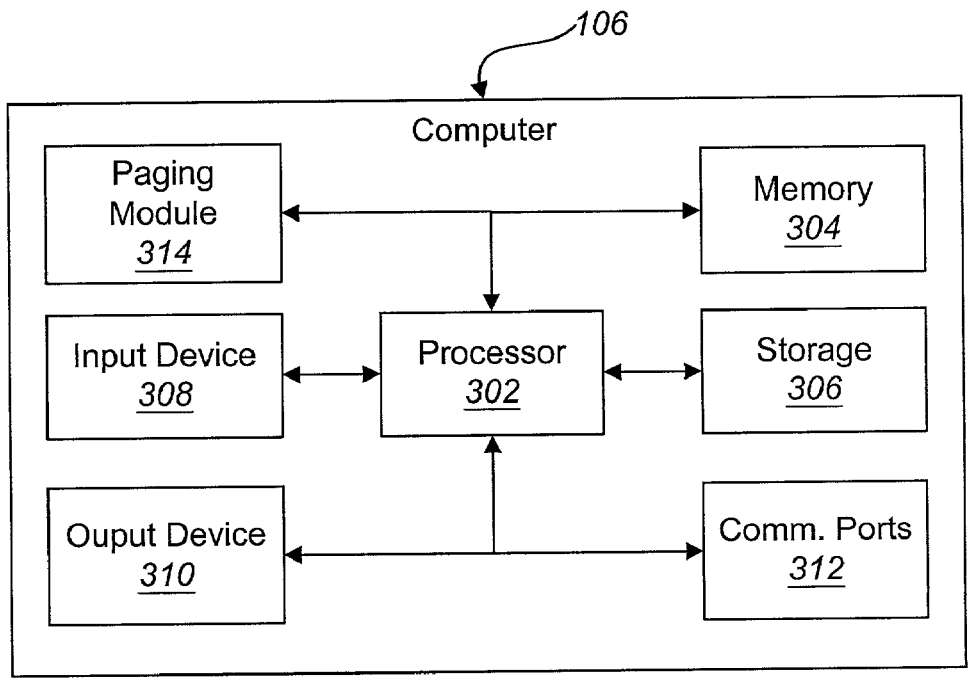
FIG. 3 is a block diagram of hardware components that may be used in an embodiment of a computer.

FIG. 3 is a block diagram of hardware components that may be used in an embodiment of a computer 106 used in the systems 100, 200 illustrated in FIGS. 1 and 2. As stated, the computer 106 may be used to monitor, control and/or otherwise communicate with the electronic device 102. The embodiment of the computer 106 shown in FIG. 3 communicates with the electronic device(s) 102 through the communications module 104. The computer 106 may send and/or receive communications to/from the communications module 104 using the paging network 108, through the communications network 110, or through another communication system (not shown).

Many different types of computer systems may be used to implement the computer 106 illustrated herein. The diagram of FIG. 3 illustrates typical components of a computer 106 including a processor 302, memory 304, a storage device 306, an input device 308, and an output device 310. One or more communication ports 312 may also be included in the computer 106. It will be appreciated by those skilled in the art that more components may be included in the computer 106. For example, several input devices 308 may be included, such as a keyboard, a mouse, a joystick, a touch screen, etc. In addition, several output devices 310 may be included such as a monitor, speakers, a printer, etc. Thus, those skilled in the art will appreciate that additional components may be added to the computer 106 without detracting from the functionality to serve as a computer 106.

The computer 106 may be a conventional desktop computer. Desktop computers are commercially available. However, it will be appreciated by those skilled in the art that the computer 106 is a broadly defined digital computer. A computer 106, as used herein, is any device that includes a digital processor capable of receiving and processing data. A computer 106 includes the broad range of digital computers including microcontrollers, hand-held computers, personal computers, servers, mainframes, supercomputers, and any variation or related device thereof. In current design, the computer 106 is typically an IBM-compatible personal computer running the Linux or Microsoft Windows 95/98/2000 or NT operating system. Of course, other types of computers with different operating systems may be used. For example, an Apple computer or a UNIX workstation may be used as the computer 106.

A paging module 314 may be used to communicate with the communications module 104 through the paging network 108. Paging units or modules 314 that may be used with the computer 106 are commercially available. Alternatively, the computer 106 may send pages out through the communications network 110 to be sent through the paging network 108 by a paging service provider (not shown). Thus, the computer 106 may not need a paging module 314 but may simply use the present systems in place and available for sending and/or receiving pages. The use of paging networks and sending/receiving pages is known in the art.

The computer 106 may use a communication port 312 or ports 312 to communicate with the communications module 104 through the communications network 110. For example, the computer 106 may use a modem (not shown) or a network card (not shown) to send and/or receive communications to and/or from the communications module 104. Standard communication packages and protocols are known by those skilled in the art for communicating through a modem, a network card, or the like.

Figure 4:
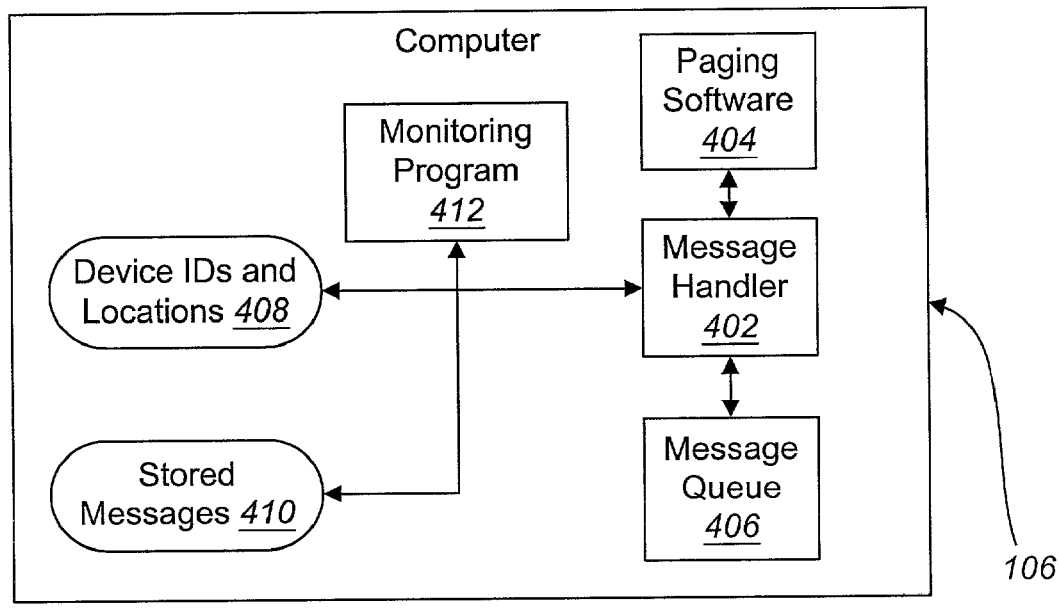
FIG. 4 is a block diagram illustrating software components of an embodiment of a computer.

FIG. 4 illustrates components of the computer 106 that may be implemented through software and/or stored data on the storage 306 or memory 304 of the computer 106. A message handler 402 may handle messages being communicated to and from the electronic device 102. The messages may be transmitted or received through the paging module 314 and paging network 108, through the communications network 110, and or through other communications means. The message handler 402 may read and write data to and from paging software 404 in order to send and receive messages through the paging network 108.

The computer 106 may include a message queue 406 to queue up the messages to be sent out, or to queue up the messages being received. Of course, it will be appreciated by those skilled in the art that other data structures may be used to store messages. Other messages 410 may be stored on the computer 106 in addition to the messages in the message queue 406.

Device identifications and locations 408 may be included at the computer 106 to identify the various devices 102 that may receive and/or send messages. Device identification and location data 408 may include as much information as one skilled in the art deems necessary or appropriate for the particular application. For example, device identification and location data 408 may include the name of the device (not shown), the electronic address (not shown), the telephone number (not shown), the device serial number, etc.

A monitoring program 412 may also be included for enabling a user to monitor and/or control the electronic device 102. The design of the monitoring program 412 may depend on the particular electronic device 102 and its implementation. Typically, the monitoring program 412 allows a user to read data from the electronic device 102 and to send commands to the electronic device 102. For example, if the electronic device 102 were a thermostat, the monitoring program 412 may allow a user to read the current temperature at the thermostat and to change the temperature setting on the thermostat.

The computer 106 may also have other software components not shown. For example, the computer 106 includes an operating system (not shown). In addition, other program, applications, libraries or modules may also be included on the computer 106 to provide further functionality to the computer 106.

Figure 5:
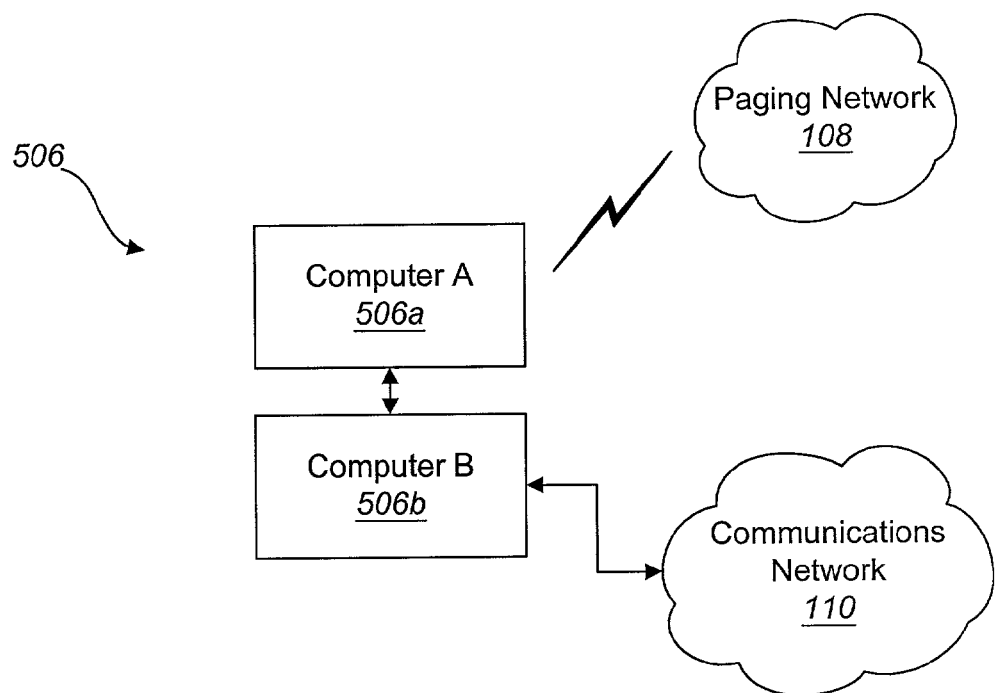
FIG. 5 is a block diagram illustrating an embodiment using two computers.

It will be appreciated by one skilled in the art that more than one computer 106 may be used to run applications and/or accomplish other computer-related tasks. For example, the computer 106 illustrated herein may be a single computer 106, or it may be a computer system 506 including several computers working to accomplish a task or tasks. As shown in FIG. 5, the computer system 506 may include two computers, computer A 506a and computer B 506b. Computer A 506a may include the paging functionality necessary to send and/or receive pages via the paging network 108. Computer B 506b may include the monitoring program to monitor and/or control the embedded device 102. Computer A 506a and computer B 506b may be networked together.

Figure 6:
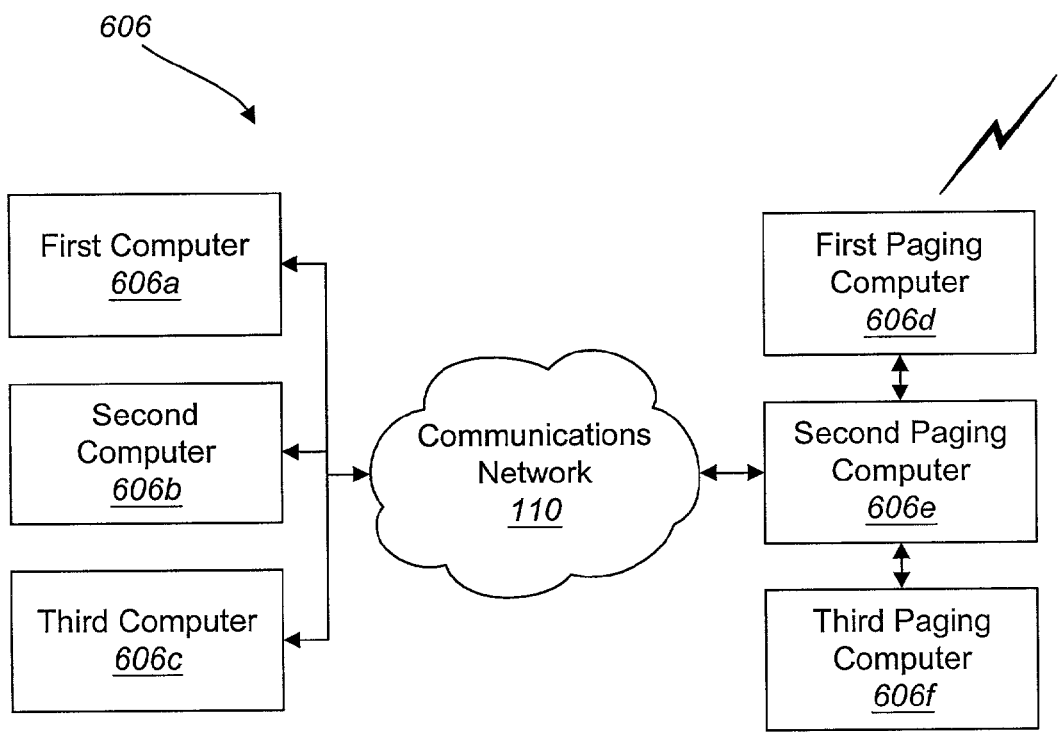
FIG. 6 is a block diagram illustrating an embodiment using several computers.

FIG. 6 illustrates another embodiment of the computer 106. The computer system 606 of FIG. 6 includes a number of computers networked together to achieve the functionality of the computer 106. A first computer 606a, a second computer 606b and a third computer 606c may be in electronic communication (e.g., via a local area network) to accomplish the monitoring program 412 (shown in FIG. 4) and the message handler 402 (shown in FIG. 4). Additional computers may be used for sending and receiving pages through the paging network 108. The paging computers may include a first paging computer 606d, and second paging computer 606e and a third paging computer 606f. The first paging computer 606d may include the paging module 314 (shown in FIG. 3) for sending and/or receiving pages. The other paging computers 606e, 606f may provide additional support and processing power needed for the paging functionality. The communications network 110 may provide electronic communications between the individual computers 606a-f.

Figure 7:
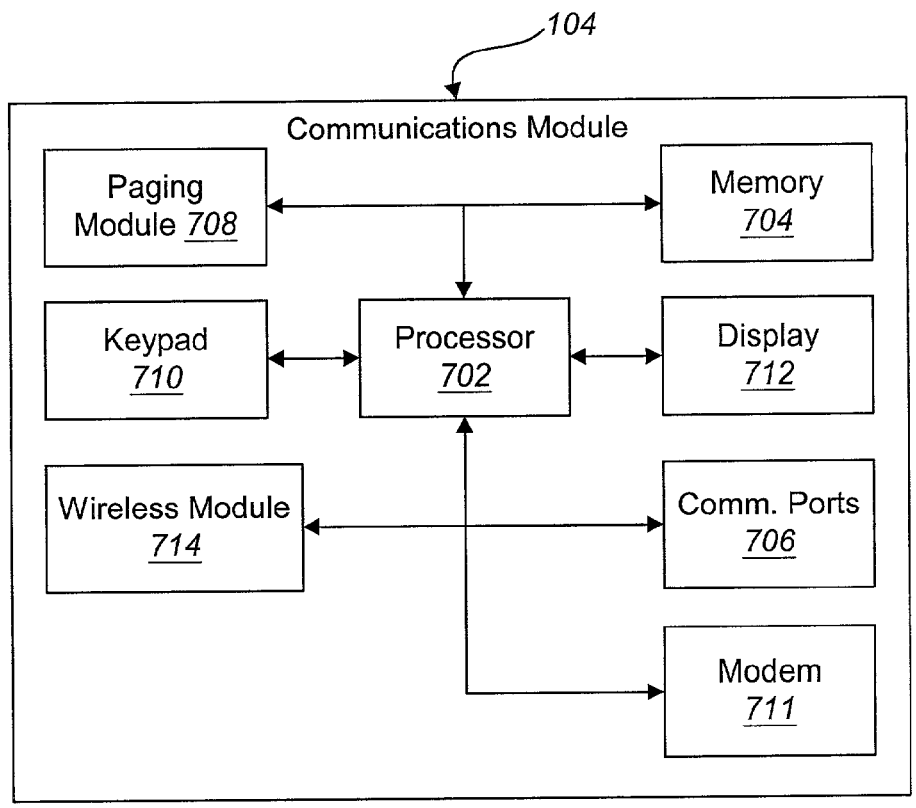
FIG. 7 is a block diagram illustrating hardware components of an embodiment of a communications module.

FIG. 7 is a block diagram illustrating hardware components of an embodiment of a communications module 104. An embodiment of a communications module 104 includes a processor 702 and memory 704. Those skilled in the art will appreciate the various types of processors and memory that can be used. For example, an embodiment of the communications module 104 may include a single-board computer that includes the processor 702 and memory 704. Such single-board computers are commercially available. Alternatively, the communications module 104 may include a microcontroller as the processor 702. In addition, embodiments of the communications module 104 may include flash memory.

The communications module 104 may also include communications ports 706. The communications ports 706 enable communication with other electronic devices. Those skilled in the art will appreciate the various types of communication ports 706 that can be used with the embodiments herein.

A paging module 708 is included in the communications module 104 for communications through the paging network 108. Paging units or modules 708 that are capable of receiving pages through a paging network 108 are commercially available. One such commercially available pager communications module 708 is the CreataLink receiver module available from Motorola, Inc.

The embodiment of FIG. 7 also includes a keypad 710 or a set of buttons or switches for input. Through the input means a user may navigate through menus, cause messages to be displayed, etc. The keypad 710, or any other input means that could be used with the communications module 104, is used by the user to enter user inputs. Other input means may include a touch screen, switches, sensors, a keyboard, a mouse, a joystick, etc. It will be appreciated by one skilled in the art that many different types of input means may be used with the communications module 104.

An embodiment of a communications module 104 may also include an output device, such as a display 712, to present information to the user. For example, when a message is sent to the communications module 104, the message or information relating to the message may be displayed to the user on a display 712. A typical display that may be used is an LCD. Other output devices may also be used. For example, a speaker for voice messages, alarms, beeps, etc. to the user could be used. By way of further example, a printer may also be used to print information for the user. In addition, the communications module 104 may not directly present information to the user but may send information to another device for presenting the information to the user. For example, the communications module 104 may send information to a telephone (not shown), a television (not shown), a personal computer (not shown), etc., for that particular device to present the information to the user.

A wireless module 714 may also be included in the communications module 104. The wireless module 714 provides a means for the communications module 104 to communicate with the electronic device(s) 102. Wireless modules 714 are commercially available and can readily be obtained. The embodiment of the wireless module 714 in FIG. 7 transmits and receives radio frequency signals and/or messages.

A modem 711 is included in the communications module 104 for communications through the communications network 110. Modems 711 are commercially available. The modem 711 is in electronic communication with the processor 702 for communicating with the computer 106 through the communications network 110.

Figure 8:
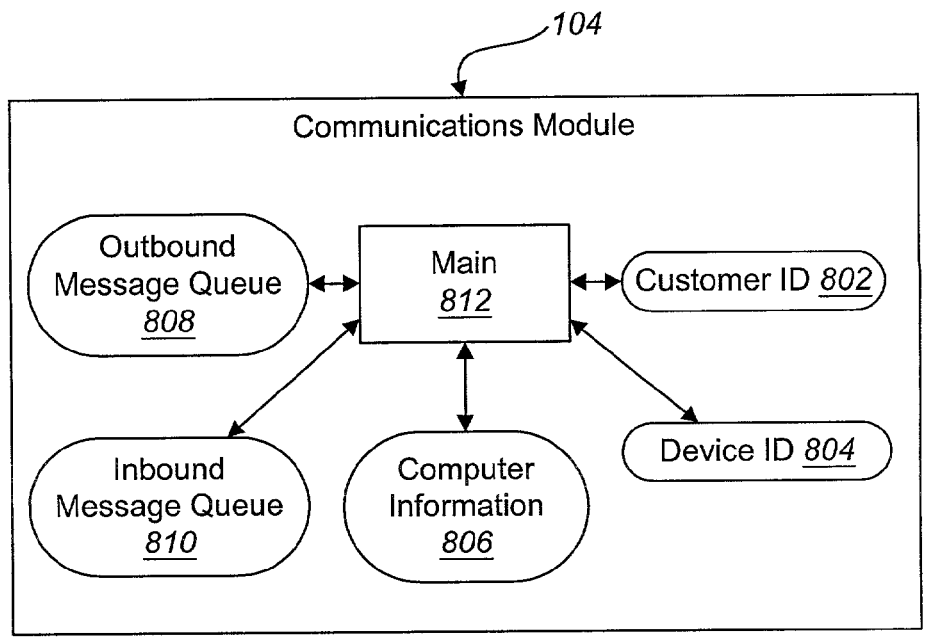
FIG. 8 is a block diagram illustrating software components of an embodiment of a communications module.

FIG. 8 is a block diagram illustrating software components of an embodiment of a communications module 104. Although the items of FIG. 8 are described as being software components, it will be appreciated that hardware components may be substituted for various software components. In addition, some hardware components may be achieved through software components.

A customer identification 802 may be stored to identify the customer, or the person or entity associated with the communications module 104. Device data 804 may be stored to identify the electronic device 102 that is communicating with the communications module 104. Monitoring computer information 806 may also be stored to identify the computer 106, which may include a telephone number, an IP address, the computer name, a URL, etc. The monitoring computer information 806 may include enough information to enable the communications module 104 to establish communications with the computer 106.

The communications module 104 may include an outbound message queue 808 and an inbound message queue 810. Outbound messages being sent from the electronic device 102 to the computer 106 may be stored in the outbound message queue 808. Inbound messages being sent from the computer 106 to the electronic device 102 may be stored in the inbound message queue 810.

A main module 812 may be used to control the overall operation of the communications module 106. The main module 812 may send and/or receive messages and place them in the appropriate queue 808, 810. In addition, when an electronic device 102 contacts the communications module 104, the main module 812 may place messages received from the device 102 to be sent to the computer 106 in the outbound message queue 808. The main module 812 may also search the inbound message queue 810 for messages to the electronic device 102 and may send the appropriate messages to the device 102.

Figure 9:
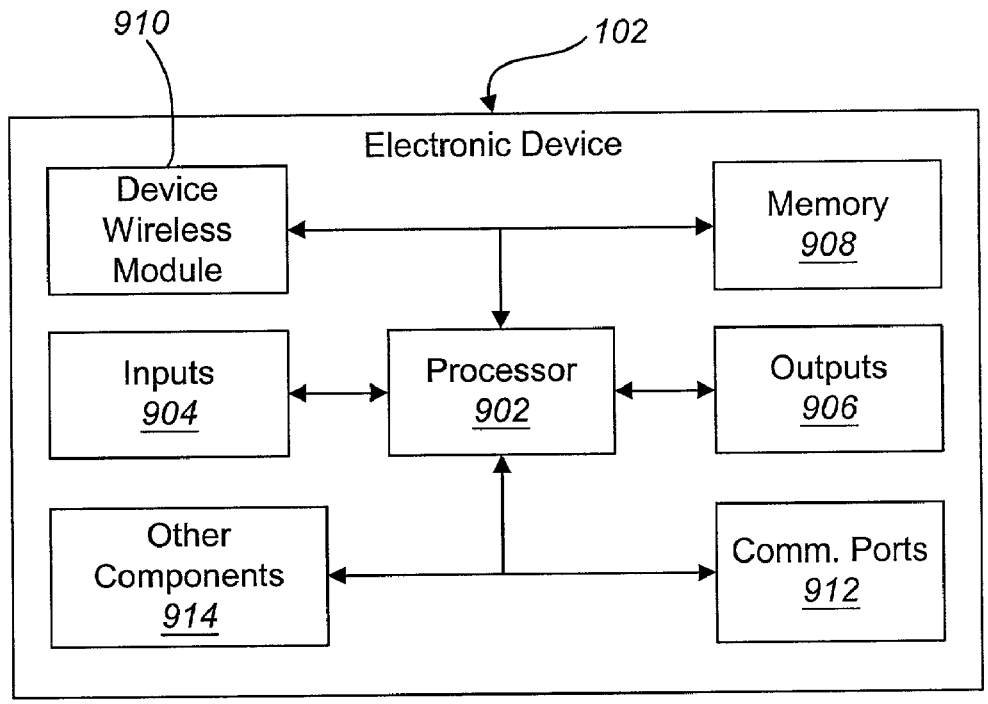
FIG. 9 is a block diagram illustrating hardware components of an embodiment of an electronic device.

FIG. 9 is block diagram illustrating the major hardware components typically utilized in electronic/embedded devices 102. An electronic device 102 typically includes a processor 902 in electronic communication with input components or devices 904 and/or output components or devices 906. The processor 902 is operably connected to input 904 and/or output devices 906 capable of electronic communication with the processor 902, or, in other words, to devices capable of input and/or output in the form of an electrical signal. Embodiments of devices 102 may include the inputs 904, outputs 906 and the processor 902 within the same physical structure.

The electronic device 102 may also include memory 908. The memory 908 may be a separate component from the processor 902, or it may be on-board memory 908 included in the same part as the processor 902. For example, microcontrollers often include a certain amount of on-board memory.

The processor 902 is also in electronic communication with a device wireless module 910. The device wireless module 910 may be used for communications with the communications module 104. Thus, the device wireless module 910 and the wireless module 714 may be designed to communicate with each other to send signals or messages between the electronic device 102 and the communications module 104.

The electronic device 102 may also include other communication ports 912. In addition, other components 914 may also be included in the electronic device 102.

Figure 10:
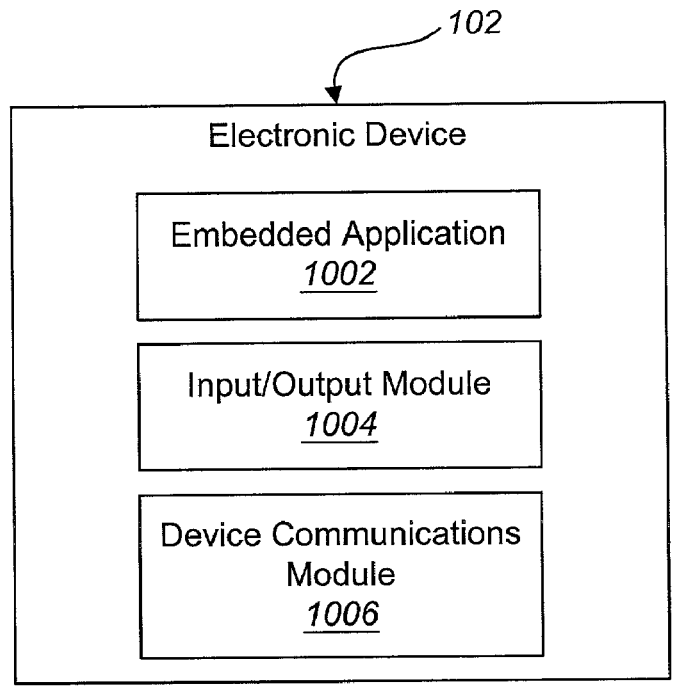
FIG. 10 is a block diagram illustrating software components of an embodiment of an electronic device.

FIG. 10 illustrates software modules that may be used with the electronic device 102. An embedded application 1002 may be used to operate the electronic device 102. The embedded application 1002 may include the functionality needed for operation of the electronic device 102. An input/output module 1004 may be used for receiving data from the input(s) 904 and for sending data to the output(s) 906. Depending on the type of electronic device 102, the particular functionality of the input/output module 1004 may vary.

A device communications module 1006 may be included with functionality to handle incoming and outgoing messages. For example, the device communications module 1006 may include the instructions necessary to send and receive communications using the device wireless module 910.

The electronic device 102 typically includes software to accomplish various tasks including communications, input/output and the monitoring or controlling of the device 102. The device communications module 1006 represents the computer program routines or instructions that handle the communications through the device wireless module 910 or through the communications port(s) 912. The input/output module 1004 represents the computer program routines or instructions that handle the input to the device 102 and the output from the device 102. For example, if there were buttons (not shown) on the device 102, the input/output module 1004 includes the code necessary to process the inputs from the buttons (not shown). The application 1002 controls the device 102 and acts as the main program to carry out tasks of the device 102. Those skilled in the art will appreciate that the software blocks are only examples and the configuration of blocks shown are not necessary to practice the present embodiments. As explained earlier, many different types of devices 102 are available and can be used with embodiments herein. These devices 102 usually already have the necessary software loaded to run the device 102. Embodiments herein can be used with almost all electronic devices 102 that are capable of electronic communications and have some processing capability.

Figure 11:
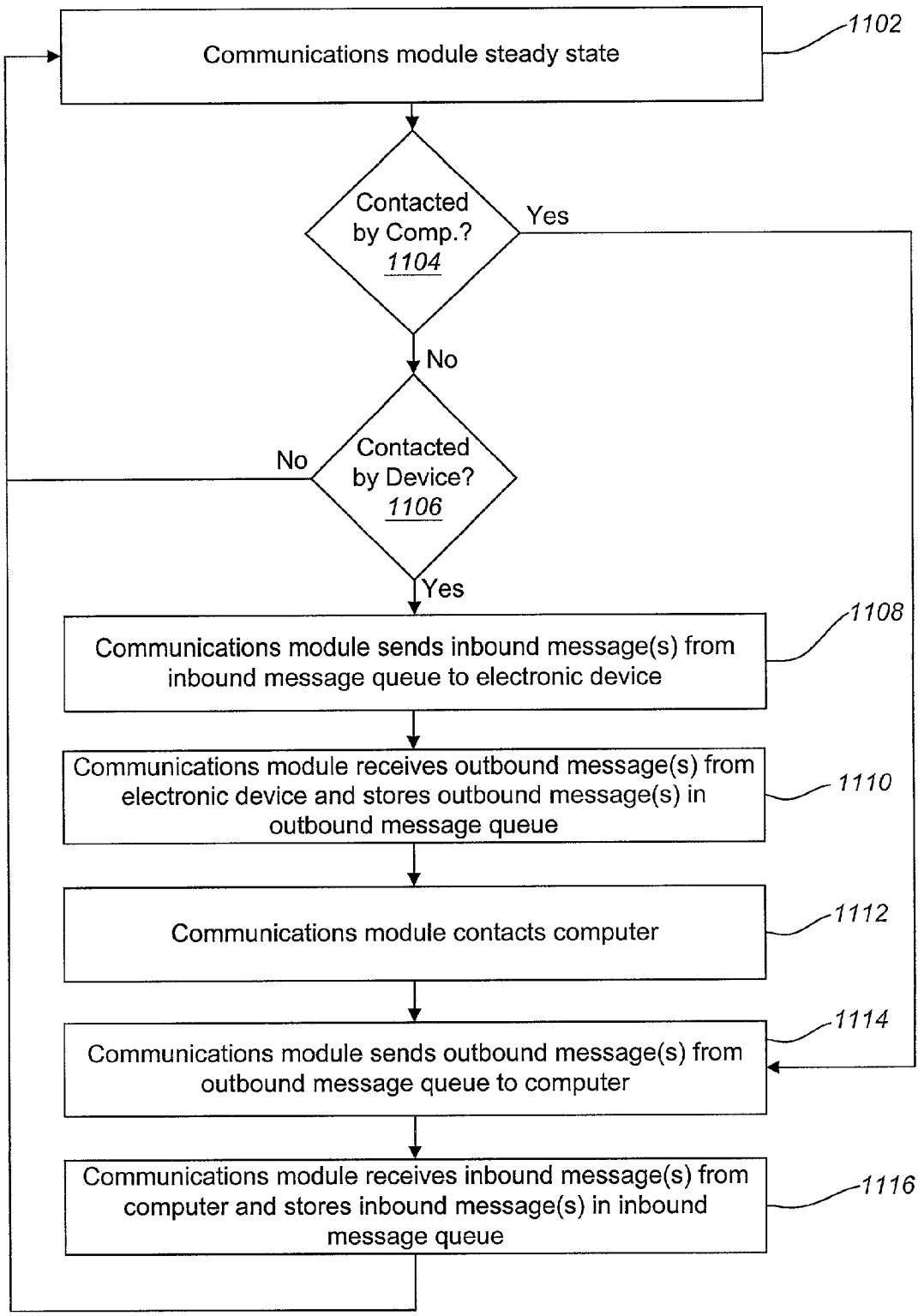
FIG. 11 is a flow diagram of a method for communicating using an embodiment of a communications module.

FIG. 11 illustrates one possible method of operation for the embodiments disclosed herein. The communications module 104 may be in its normal operation state 1102 waiting to be contacted 1104 by the computer 106 or to be contacted 1106 by the electronic device 102.

When the communications module 104 is contacted 1106 by the electronic device 102, the communications module 104 may send 1108 any inbound messages it has in the inbound message queue 810 to the electronic device 102. The communications module 104 may also receive 1110 one or more outbound messages from the electronic device 102. Any outbound messages received may be stored in the outbound message queue 808.

The communications module 104 may contact 1112 the computer 106 periodically to transfer messages to and/or from the computer 106. The term periodically as used herein means more than once, but does not have any specific defined term or frequency for how often the module 104 contacts the computer 106. Those skilled in the art will appreciate that various methods may be used to contact the computer 106. For example, the computer 106 may be contacted once every time period, where the time period is set by the user and/or engineer. Alternatively, the communications module 104 may be programmed to contact the computer 106 whenever it is contacted by an electronic device 102. In addition, the communications module 104 may simply wait to be contacted by the computer 106. Of course, the communications module 104 may also be designed to implement a combination of the foregoing communication techniques, or it may implement other communication techniques known by those skilled in the art.

When the communications module 104 has been contacted 1104 by the computer 106, or when it 104 is in communication with the computer 106, the communications module 104 may send 1114 any outbound messages from the outbound message queue 808 to the computer 106. The communications module 104 may also receive 1116 any inbound messages from the computer 106 and store them in the inbound message queue 810. After the messages are transferred to their destinations or intermediate destinations, the communications module 104 may continue to process or operate under its normal parameters until the next message transfer occurs.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A communications module for facilitating wireless electronic communications with one or more electronic devices, the module comprising:

a processor;

a wireless module in electronic communication with the processor for wireless communications with one or more of the electronic devices, wherein a number of the electronic devices that may communicate with the communications module through the wireless module is dynamic;

a one-way paging module in electronic communication with the processor for communicating with a computer through a paging network;

a modem in electronic communication with the processor for communicating with the computer through a communications network;

memory in electronic communication with the processor for storing data, the memory being programmed to contact the computer whenever the communications module is contacted by one or more of the electronic devices and being programmed to identify one or more of the electronic devices when one or more of the electronic devices contacts the communications module, wherein the computer is remotely located from the communications module;

a customer identification stored in memory to identify a customer associated with the communications module;

an outbound message queue for storing outbound messages being sent from one or more of the electronic devices to the computer; and an inbound message queue for storing inbound messages being sent to one or more of the electronic devices from the computer, wherein each inbound message includes a device ID and wherein the memory is further programmed to search the inbound message queue for appropriate inbound messages using the device ID for one or more of the electronic devices and to transmit the appropriate inbound messages to one or more of the electronic devices, wherein the electronic devices include a thermostat.

2. The communications module as defined in claim 1 wherein the memory is programmed with instructions to cause the processor to communicate with one or more of the electronic devices using the wireless module.

3. The communications module as defined in claim 1 wherein the memory is programmed with instructions to cause the processor to communicate with the computer using the paging module.

4. The communications module as defined in claim 1 wherein the memory is programmed with instructions to cause the processor to communicate with the computer through the communications network using the modem.

5. The communications module as defined in claim 1 wherein the processor is a microcontroller.

6. The communications module as defined in claim 1 programmed to periodically contact the computer using the modem.

7. The communications module as defined in claim 6 further programmed to send the outbound messages to the computer when the computer is periodically contacted.

8. The communications module as defined in claim 1 programmed to be periodically contacted by one or more of the electronic devices.

9. The communications module as defined in claim 1 programmed to be periodically contacted by one or more of the electronic devices through the wireless module.

10. The communications module as defined in claim 1 further programmed to send the outbound messages to the computer when the computer is periodically contacted.

11. The communications module as defined in claim 6 further programmed to receive the inbound messages from the computer when the computer is periodically contacted.

12. The communications module as defined in claim 1 further programmed to be periodically contacted by one or more of the electronic devices.

13. The communications module as defined in claim 1 programmed to be periodically contacted by one or more of the electronic devices through the wireless module.

14. The communications module as defined in claim 12 further programmed to send the inbound messages to one or more of the electronic devices when one or more of the electronic devices periodically contacts the communications module.

15. The communications module as defined in claim 1 programmed to contact the computer using the modem in response to a request communication from the computer received through the paging module.

16. A communications module for facilitating electronic communications between a computer and one or more remote electronic devices, wherein the computer is programmed to send pages to the communications module through a paging network and wherein the communications module is programmed to contact the computer through a communications network, the module comprising:

a processor;

a wireless module in electronic communication with the processor for wireless communications with one or more of the electronic devices, wherein a number of the electronic devices that may communicate with the communications module through the wireless module is dynamic;

a one-way paging module in electronic communication with the processor for receiving pager communications from the computer through the paging network;

a modem in electronic communication with the processor for communicating with the computer through the communications network, wherein the computer is remotely located from the communications module;

memory in electronic communication with the processor for storing data, the memory being programmed to contact the computer whenever the communications module is contacted by one or more of the electronic devices and being programmed to identify one or more of the electronic devices when one or more of the electronic devices contacts the communications module;

a customer identification stored in memory to identify a customer associated with the communications module;

an outbound message queue for storing outbound messages being sent from one or more of the electronic devices to the computer; and an inbound message queue for storing inbound messages being sent to one or more of the electronic devices from the computer, wherein each inbound message includes a device ID and wherein the memory is further programmed to search the inbound message queue for appropriate inbound messages using the device ID for one or more of the electronic devices and to transmit the appropriate inbound messages to one or more of the electronic devices, wherein the electronic devices include a thermostat.

17. The communications module as defined in claim 16 wherein the communications module is programmed with wireless instructions to cause the processor to communicate with one or more of the electronic devices using the wireless module.

18. The communications module as defined in claim 17 wherein the communications module is further programmed with pager instructions to cause the processor to receive the pager communications from the computer using the paging module.

19. The communications module as defined in claim 18 wherein the communications module is further programmed with modem instructions to cause the processor to communicate with the computer through the communications network using the modem.

20. The communications module as defined in claim 16 wherein the processor is a microcontroller.

21. The communications module as defined in claim 20 programmed to periodically contact the computer using the modem.

22. The communications module as defined in claim 21 further programmed to receive the inbound messages from the computer when the computer is periodically contacted.

23. The communications module as defined in claim 16 programmed to be periodically contacted by one or more of the electronic devices through the wireless module.

24. The communications module as defined in claim 23 further programmed to send the inbound messages to one or more of the electronic devices when one or more of the electronic devices periodically contacts the communications module.

25. The communications module as defined in claim 16 further programmed to send the outbound messages to the computer when the computer is periodically contacted.

26. The communications module as defined in claim 19 programmed to contact the computer using the modem in response to a request communication from the computer received through the paging module.

27. A communications module for facilitating electronic communications between a computer and a plurality of remote electronic devices, wherein the computer is programmed to send pages to the communications module through a paging network and wherein the communications module is programmed to contact the computer through a communications network, the module comprising:

a processor;
a wireless module in electronic communication with the processor for wireless communications with the plurality of electronic devices, wherein a number of the electronic devices that may communicate with the communications module through the wireless module is dynamic;
a one-way paging module in electronic communication with the processor for receiving pager communications from the computer through the paging network;
a modem in electronic communication with the processor for communicating with the computer through the communications network, wherein the computer is remotely located from the communications module;
memory in electronic communication with the processor for storing data, the memory being programmed to contact the computer whenever the communications module is contacted by one or more of the plurality of electronic devices and being programmed to identify one or more of the electronic devices when one or more of the electronic devices contacts the communications module;
a customer identification stored in memory to identify a customer associated with the communications module;
an outbound message queue for storing outbound messages being sent from the plurality of electronic devices to the computer; and
an inbound message queue for storing inbound messages being sent to the plurality of electronic devices from the computer, wherein each inbound message includes a device ID and wherein the memory is further programmed to search the inbound message queue for appropriate inbound messages using the device ID for one or more of the electronic devices and to transmit the appropriate inbound messages to one or more of the electronic devices, wherein the electronic devices include a thermostat.

28. The communications module as defined in claim 27 wherein the communications module is programmed with wireless instructions to cause the processor to communicate with the plurality of electronic devices using the wireless module.

29. The communications module as defined in claim 28 wherein the communications module is further programmed with pager instructions to cause the processor to receive the pager communications from the computer using the paging module.

30. The communications module as defined in claim 29 wherein the communications module is further programmed with modem instructions to cause the processor to communicate with the computer through the communications network using the modem.

31. The communications module as defined in claim 30 wherein the paging module is a one-way paging module for receiving pages.

32. The communications module as defined in claim 31 wherein the processor is a microcontroller.

33. The communications module as defined in claim 32 programmed to periodically contact the computer using the modem.

34. The communications module as defined in claim 33 further programmed to receive the inbound messages from the computer when the computer is periodically contacted.

35. The communications module as defined in claim 27 programmed to be periodically contacted by the plurality of electronic devices through the wireless module.

36. The communications module as defined in claim 27 further programmed to send the outbound messages to the computer when the computer is periodically contacted.

37. A method for facilitating electronic communications between a computer and one or more remote electronic devices, the method comprising:
sending one or more inbound messages, by the computer, to a communications module, wherein the communications module comprises:
a processor;
a wireless module in electronic communication with the processor for wireless communications with one or more of the electronic devices, wherein a number of the electronic devices that may communicate with the communications module through the wireless module is dynamic;
a one-way paging module in electronic communication with the processor for receiving pager communications from the computer through a paging network, wherein the computer is remotely located from the communications module;
a modem in electronic communication with the processor for communicating with the computer through a communications network;
memory in electronic communication with the processor for storing data, the memory being programmed to contact the computer whenever the communications module is contacted by one or more of the electronic devices and being programmed to identify one or more of the electronic devices when one or more of the electronic devices contacts the communications module; and
a customer identification stored in memory to identify a customer associated with the communications module;
storing the inbound messages in an inbound message queue, wherein each inbound message includes a device ID;
searching the inbound message queue for appropriate inbound messages using the device ID for one or more of the electronic devices, wherein the electronic devices include a thermostat;
sending one or more of the inbound messages to one or more of the electronic devices;
receiving an outbound message from one or more of the electronic devices;
storing the outbound message in an outbound message queue; and
sending the outbound message to the computer from the communications module.

38. The method as defined in claim 37 further comprising communicating with one or more of the electronic devices when one or more of the electronic devices periodically contacts the communications module.

39. The method as defined in claim 37 wherein sending the inbound message to one or more of the electronic devices is accomplished through use of the wireless module.

40. The method as defined in claim 37 wherein sending the outbound message to the computer from the communications module is accomplished through use of the modem.

41. The method as defined in claim 37 wherein the communications module is programmed to periodically contact the computer using the modem.

42. The method as defined in claim 41 wherein the communications module is further programmed to receive the inbound message from the computer when the computer is periodically contacted.

43. The method as defined in claim 42 wherein the communications module is further programmed to send the outbound message to the computer when the computer is periodically contacted.

44. The method as defined in claim 37 wherein the communications module is programmed to be periodically contacted by one or more of the electronic devices through the wireless module.

45. The method as defined in claim 44 wherein the communications module is further programmed to send the inbound messages to one or more of the electronic devices when one or more of the electronic devices periodically contacts the communications module.

46. A communications module for facilitating wireless electronic communications with one or more electronic devices the module comprising:

a processor;

a wireless module in electronic communication with the processor for wireless communications with one or more of the electronic devices, wherein a number of the electronic devices that may communicate with the communications module through the wireless module is dynamic;

a first modem in electronic communication with the processor for communicating with a computer through a communications network, wherein the computer is remotely located from the communications module;

a second modem in electronic communication with the processor for communicating with the computer through the communications network;

a one-way paging module in electronic communication with the processor for receiving pager communications from the computer through a paging network;

memory in electronic communication with the processor for storing data, the memory being programmed to contact the computer whenever the communications module is contacted by one or more of the electronic devices and being programmed to identify one or more of the electronic devices when one or more of the electronic devices contacts the communications module;

a customer identification stored in memory to identify a customer associated with the communications module;

an outbound message queue for storing outbound messages being sent from one or more of the electronic devices to the computer; and an inbound message queue for storing inbound messages being sent to one or more of the electronic devices from the computer, wherein each inbound message includes a device ID and wherein the memory is further programmed to search the inbound message queue for appropriate inbound messages using the device ID for one or more of the electronic devices and to transmit the appropriate inbound messages to one or more of the electronic devices, wherein the electronic devices include a thermostat.

47. A system for facilitating electronic communications between a computer and a plurality of remote electronic devices, wherein the computer is programmed to send pages to a communications module through a paging network and wherein the communications module is programmed to contact the computer through a communications network, wherein the computer is remotely located from the communications module, the system comprising:

a computer, wherein the computer comprises:
a processor;
a paging module in electronic communication with the processor for sending pager communications to the communications module though a paging network;
a modem in electronic communication with the processor for communicating with the communications module through a communications network;
a message handler for reading and writing data to and from paging software in order to send and receive messages through the paging network; and
memory in electronic communication with the processor for storing data, the memory being programmed to periodically contact the communications module;

a communications module, wherein the module comprises:
a processor;
a wireless module in electronic communication with the processor for wireless communications with the plurality of electronic devices, wherein a number of the electronic devices that may communicate with the communications module through the wireless module is dynamic;
a one-way paging module in electronic communication with the processor for receiving pager communications from the computer through the paging network;
a modem in electronic communication with the processor for communicating with the computer through the communications network;
memory in electronic communication with the processor for storing data, the memory being programmed to contact the computer whenever the communications module is contacted by one or more of the plurality of electronic devices and being programmed to identify one or more of the electronic devices when one or more of the electronic devices contacts the communications module;
an outbound message queue for storing outbound messages being sent from the plurality of remote electronic devices to the computer; and
an inbound message queue for storing inbound messages being sent to the plurality of remote electronic devices from the computer, wherein each inbound message includes a device ID and wherein the memory is further programmed to search the inbound message queue for appropriate inbound messages using the device ID for one or more of the electronic devices and to transmit the appropriate inbound messages to one or more of the electronic devices, wherein the electronic devices include a thermostat.

48. The communications module as defined in claim 16, wherein the communications module is a single-board computer, wherein the processor is a microcontroller, wherein the communications module further comprises a display that displays a message when received by the communications module, wherein the one or more electronic devices includes a thermostat, and wherein the communications module is programmed to read a current temperature at the thermostat and to change a temperature setting on the thermostat using the wireless module.

49. The communications module as defined in claim 48, wherein the memory includes device data stored to identify the one or more electronic devices and monitoring computer information stored to identify the computer, wherein the monitoring information comprises a telephone number, an IP address, a computer name or a URL.

* * * * *